United States Patent [19]

Kratcoski et al.

[11] 4,072,410
[45] Feb. 7, 1978

[54] CONVERTIBLE INPUT READER-PRINTER

[75] Inventors: Frank L. Kratcoski, Trapon Springs, Fla.; Herbert H. Hausmann, Prairie View, Ill.

[73] Assignee: Oce'-Industries, Inc., Chicago, Ill.

[21] Appl. No.: 679,246

[22] Filed: Apr. 22, 1976

[51] Int. Cl.² ............................................. G03B 21/11
[52] U.S. Cl. ..................................................... 353/68
[58] Field of Search .............. 353/68, 25, 26 R, 26 A, 353/27 R, 27 A

[56] References Cited

U.S. PATENT DOCUMENTS 3,672,756   6/1972   Kinsinger ............................... 353/68

*Primary Examiner*—Harry N. Haroian

[57] ABSTRACT

A reader-printer incorporates a fiche film projecting system and a roll film projecting system in a compact module compatible with existing main frame designs for reader-printers. Both projection systems align with a common optical axis when in operative position. Simple control means operate through a lost-motion linkage to switch a fiche lamp and condensing lens assembly and a roll beam reflecting mirror assembly in ganged relation to locate each assembly in an out-of-the-way position when the other assembly is in operative position, with the lost-motion linkage also accommodating relative vertical adjustment between these assemblies.

Novel mountings permit easy total removal and replacement of the fiche beam projection lens and selective shifting of the fiche beam condenser lens to an out-of-the-way position under the control of an apertured X-Y carrier for providing enlarged openings for the wider beam presented at these locations in the roll projection mode.

A universally adjustable roll projection lens mounting and a solenoid actuated floating roll film gate mounting offer improved versatility and performance in the roll projection mode.

13 Claims, 16 Drawing Figures

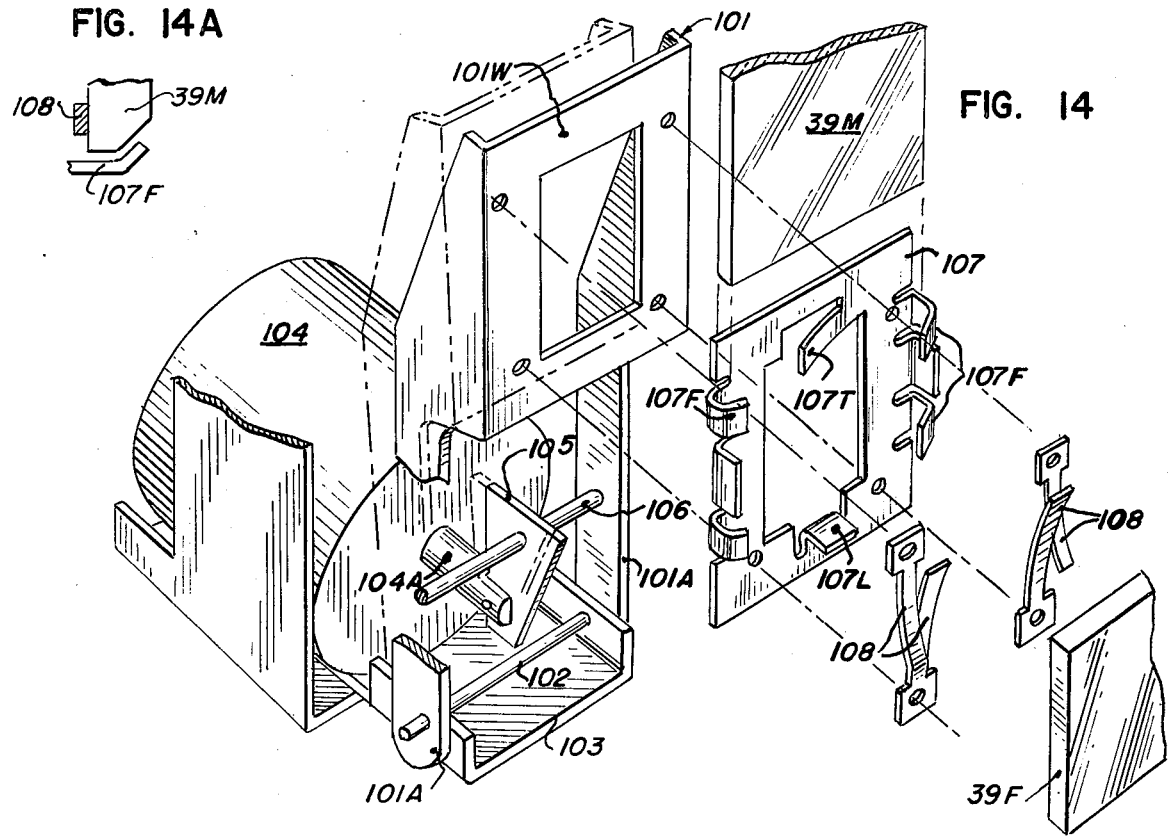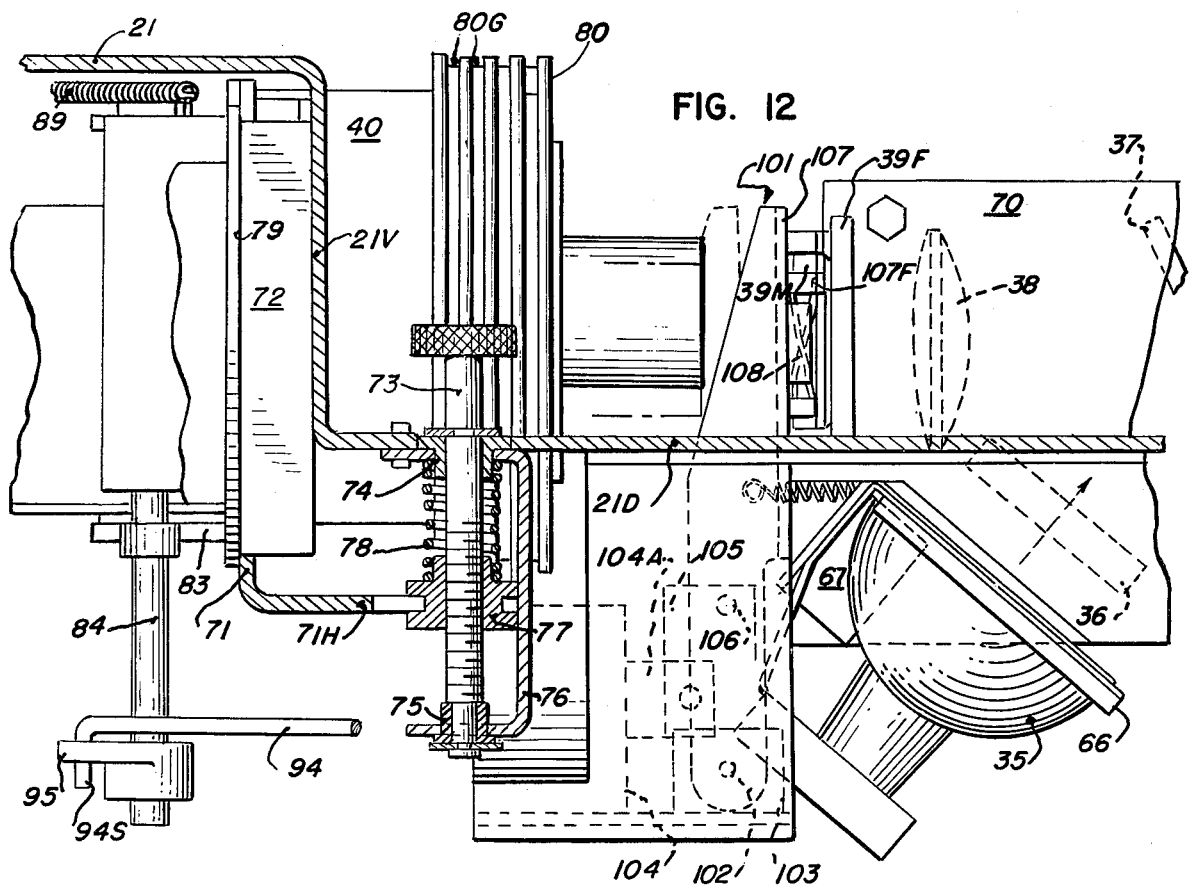

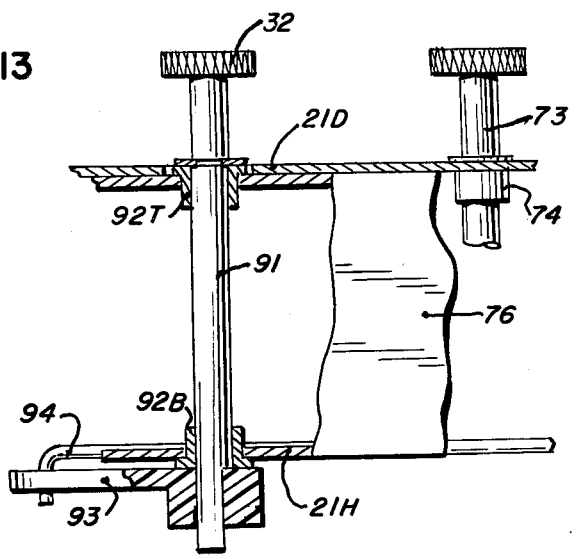

CONVERTIBLE INPUT READER-PRINTER

BACKGROUND OF THE INVENTION

This invention relates to microfilm image projection equipment of the type used in microfilm printers, readers and reader-printers and more particularly is concerned with convertible input arrangements to permit use of either roll film input or microfiche film input in a single machine.

Microfilm storage and projection systems gained their original success in the form of microfilm rolls so that today many of the early users of microfilm systems have vast libraries of microfilm rolls. More recently, the trend in the industry has been towards the use of microfiche film wherein the images are photographed in a matrix of rows and columns on a film sheet that offers greater compactness and ease of retrieval. Up until the present time, a user having libraries of both microfilm rolls and microfiche sheets has generally found it more convenient to have a separate machine for each type of film. In addition, there are many users of roll film who have not converted to microfiche film because of the additional expense and related problems of maintaining separate equipment for each type of film.

Up to the present time, the only dual purpose machines on the market have consisted of a basically roll type microfilm unit which, in addition, permits a fiche film sheet to be hand-held during projection, but this system lacks the intrinsic conveniences and advantages that have made the fiche format so popular.

There is one machine on the market which is provided with a replaceable adaptor module to permit conversion between roll format and fiche format projection systems, but such conversion requires more than two hours work by trained service personnel each time a conversion is to be made. The delay and expense associated with each conversion seriously limits the actual realization of the versatility which is intended to be achieved in such a unit.

Thus, there is a need for a microfilm projection system that may easily be converted between a roll film mode and a fiche film mode. It is also desirable that such a convertible input system accommodate the widest variety of roll film inputs so that the same machine can handle all of the existing roll film libraries while also being convertible between roll film and fiche film operation.

SUMMARY OF THE INVENTION

The present invention provides a microfilm projection arrangement suitable for use in printers, readers and readerprinters and characterized by compatibility with present day film input and projection characteristics and ease of conversion between operation in the roll projection mode and the fiche projection mode.

More particularly, the invention provides a convertible input roll/fiche microfilm system embodied in the form of a separate module directly compatible with existing main frame designs of the readers and reader-printers in order to maximize user convenience and to minimize servicing and maintenance.

In accordance with the invention, there is provided a convertible arrangement for selectively switching a fiche film projecting means and a roll film projecting means into operative alignment with a common optical axis that intersects a fiche image plane and extends to a projection plane, the arrangement being characterized in that the fiche film projecting means includes beam projecting structure mounted for controlled shifting movement between an operative position of alignment with the optical axis and an out-of-the-way position spaced from the optical axis, the roll film projecting means includes beam projecting structure mounted for controlled shifting movement between an out-of-the-way position spaced from the optical axis and said operative position of alignment, and control means interconnecting the fiche beam projecting structure and the roll beam projecting structure in ganged relationship to effect controlled shifting movement thereof for converting between a fiche film input mode and a roll film input.

In the disclosed embodiment of the convertible arrangement of this invention, the fiche film projecting means includes a fiche beam projecting lens removably mounted in an over-size opening in alignment with the common optical axis at a location beyond such operative position, and the roll film projecting means includes a roll beam projecting lens located in advance of such operative position to provide a roll beam at said opening that is wider than the fiche beam projection lens.

In accordance with a further feature of the invention, the fiche film projecting means includes fiche film X-Y carrier means having an enlarged opening forwardly of the fiche film location, slide means mounting the X-Y carrier means for shifting movement between a fiche mode position wherein the enlarged opening is forwardly of the optical axis and a roll mode position wherein the enlarged opening is in alignment with the optical axis, support means for a fiche beam condenser lens shiftably mounted for movement between an operative position in alignment with the optical axis and an out-of-the-way position, and stop means on the X-Y carrier means and the lens support means for automatically shifting the fiche beam condenser lens to an out-of-the-way position when the X-Y carrier means is moved to its roll mode position and for automatically restoring the fiche beam condenser means to operative position when the X-Y carrier means is moved forwardly to a fiche film loading position.

More particularly, the shiftable fiche beam projection structure includes an assembly of a fiche lamp and condenser lens carried by a pivotally mounted bracket that is normally acted upon by an over-center detent spring that moves the assembly to its final positions as determined by limit stops. Correspondingly, the shiftable roll beam projection structure includes a fixed angle reflecting mirror carried by a pivotally mounted vertically adjustable bracket that is normally acted upon by an over-center detent spring that moves the mirror to its final positions as determined by limit stops.

A lost-motion linkage connects these structures in ganged relation for allowing the detent springs to control final positioning of each and for allowing relative vertical shifting therebetween to accommodate roll mode scanning adjustments of the roll beam projection lens in unison with the roll mode reflecting mirror.

The roll beam projection lens is mounted for both roll film scanning adjustment and fore and aft focusing adjustment by means of separate continuously engaged manual controls.

The roll projection system includes a film gate arrangement having a solenoid actuated positive drive linkage for shifting the movable glass into and out of the film travel path. The linkage includes a bracket mounting the movable glass in floating relation, with resilient means biasing the movable glass to bias the film flat against a fixed glass offset slightly from the film travel path.

Other features and advantages of the invention will be apparent from the following description and claims, and are illustrated in the accompanying drawings which show structure embodying features of the present invention and the principles thereof.

BRIEF DESCRIPTION OF THE DRAWINGS

FIG. 12 is an enlarged fragmentary vertical section showing the roll mode arrangement appearing at the right end of FIG. 9;

FIG. 13 is a fragmentary section showing adjustment controls and is taken as indicated at 13 — 13 of FIG. 10;

FIG. 14 is an exploded perspective view of the solenoid operated film gate arrangement for the roll projection section and FIG. 14A is a movable glass mounting detail;

DESCRIPTION OF PREFERRED EMBODIMENT

DUAL MODE PROJECTION SYSTEM

Figure 1:
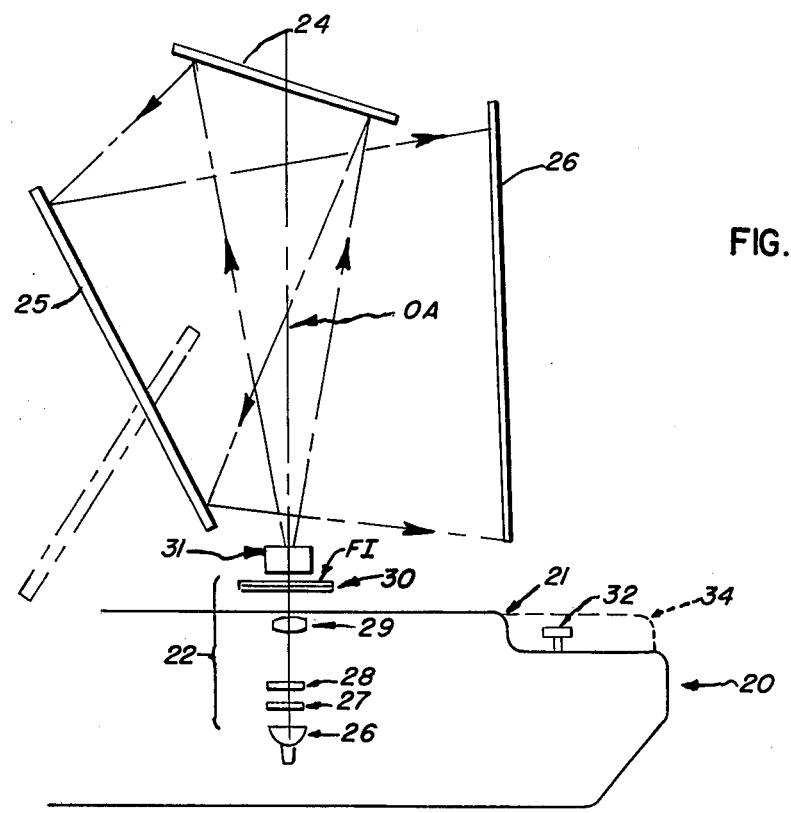
FIG. 1 is a fragmentary diagrammatic view of the film projecting section of a reader-printer in accordance with this invention to illustrate the machine operating in the fiche projection mode.
Figure 2:
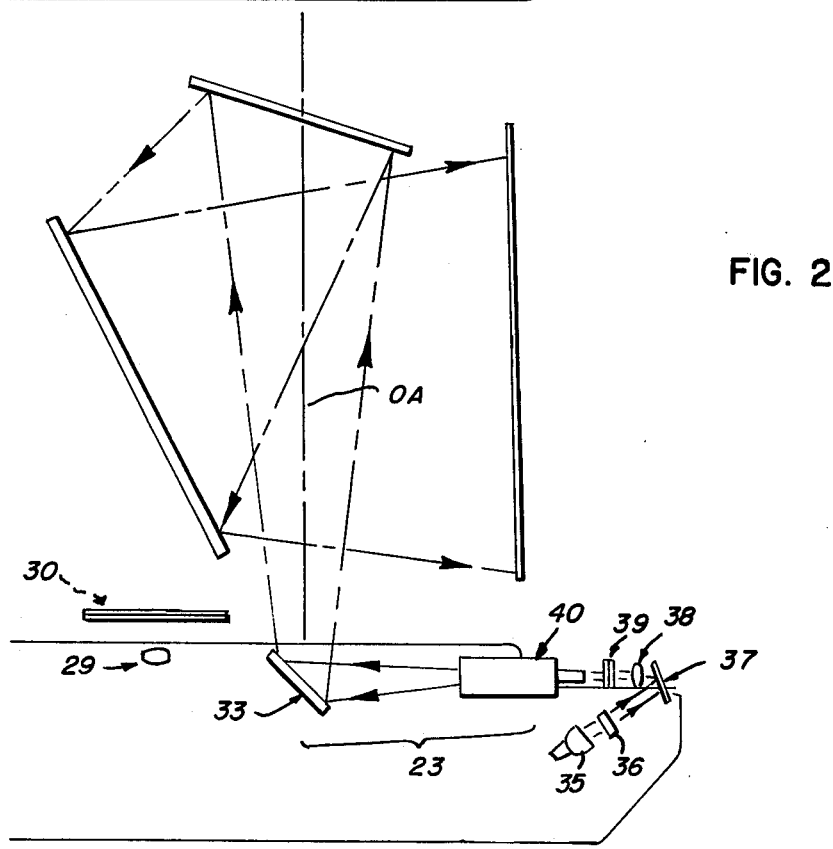
FIG. 2 is a similar view showing the machine operating in the roll projection mode.

Referring now to the drawings, and particularly to FIGS. 1 and 2, in the preferred arrangement the invention is embodied as a dual mode film projection module 20 having a pedestal base section 21 which incorporates alternately selectable facilities 22 for fiche film projection as illustrated in FIG. 1 and facilities 23 for roll film projection as illustrated in FIG. 2. Because of the unique arrangement of the dual mode projection facilities, the module is sufficiently compact to be compatible with mainframes of currently available readers and reader-printers of the microfiche projection type.

Typically, the mainframes of such machines include a top reflection mirror 24 and a back reflection mirror 25 for directing the projected beam to a viewing screen 26 during the viewing mode. These mirrors 24, 25 swing to alternate positions as shown in phantom lines in the case of reader-printer machines, for directing the projected beam to the print paper during the printing mode.

Thus, it will be noted that the invention contemplates a convertible arrangement which includes a common optical axis OA that extends to a projection plane which may be print paper in the case of a reader-printer or a viewing screen in the case of a reader or a reader-printer.

For convenience in the description of the illustrated embodiment, reference is made to a so-called operative position. This term refers to a locus along the common optical axis OA.

In the fiche mode, the fiche projection structure is aligned with the common optical axis OA and includes portions (see lnes 29) which are arranged along the locus of the operative position.

In the roll mode, the mirror 33 is located along the locus of the operative position.

Since light projected along the optical axis OA propagates towards the screen 26, elements such as the carrier 30 and the projection lens are here referred to as being beyond (that is, downstream) of the operative position. Correspondingly, the fiche elements 26, 27, 28 may be referred to as being in advance (that is, upstream) of the operative position.

In the fiche mode as shown in FIG. 1, the fiche film projecting means 22 is in operative alignment with the optical axis OA and as is conventional includes a lamp 26, a negative condenser lens 27, a heat glass 28, a positive condenser lens 29, an X-Y carrier 30 defining a fiche image plane FI and a fiche projection lens 31.

In the preferred embodiment as illustrated herein, conversion from the fiche mode is effected by manually removing the projection lens 31; by shifting the carrier 30 aft to an out-of-the-way position, with the carrier travel acting through a lost-motion connection to shift the top condenser lens 29 out of the optical path; and by actuating a manual control knob 32 for shifting the fiche lamp lens and glass assembly to an out-of-the-way position while simultaneously shifting a fixed angle plane mirror 33 into operative alignment with the optical axis OA as shown in FIG. 2. In the fiche mode, a removable cover 34 is normally mounted across the forward porch of the pedestal base 21. The cover may have an index matrix to cooperate with the usual front pointer (not shown) of the X-Y carrier 30 for fiche image selection in the usual fashion. Beneath the cover as shown in FIG. 2 is the roll film projection system which includes a separate lamp 35, a negative condenser lens 36, a plane mirror 37, positive condenser lens 38, a film gate 39 for the foll film and a prism type projection lens 40 aligned with the shiftable mirror 33 to be directed along the common optical axis OA. The prism projection lens of the roll system is vertically adjustable in unison with the mirror to enable a small size fixed angle mirror such as shown at 33 to be utilized while accommodating sufficient vertical travel of the roll projection lens 40 for scanning double image type roll film inputs.

Figure 3:
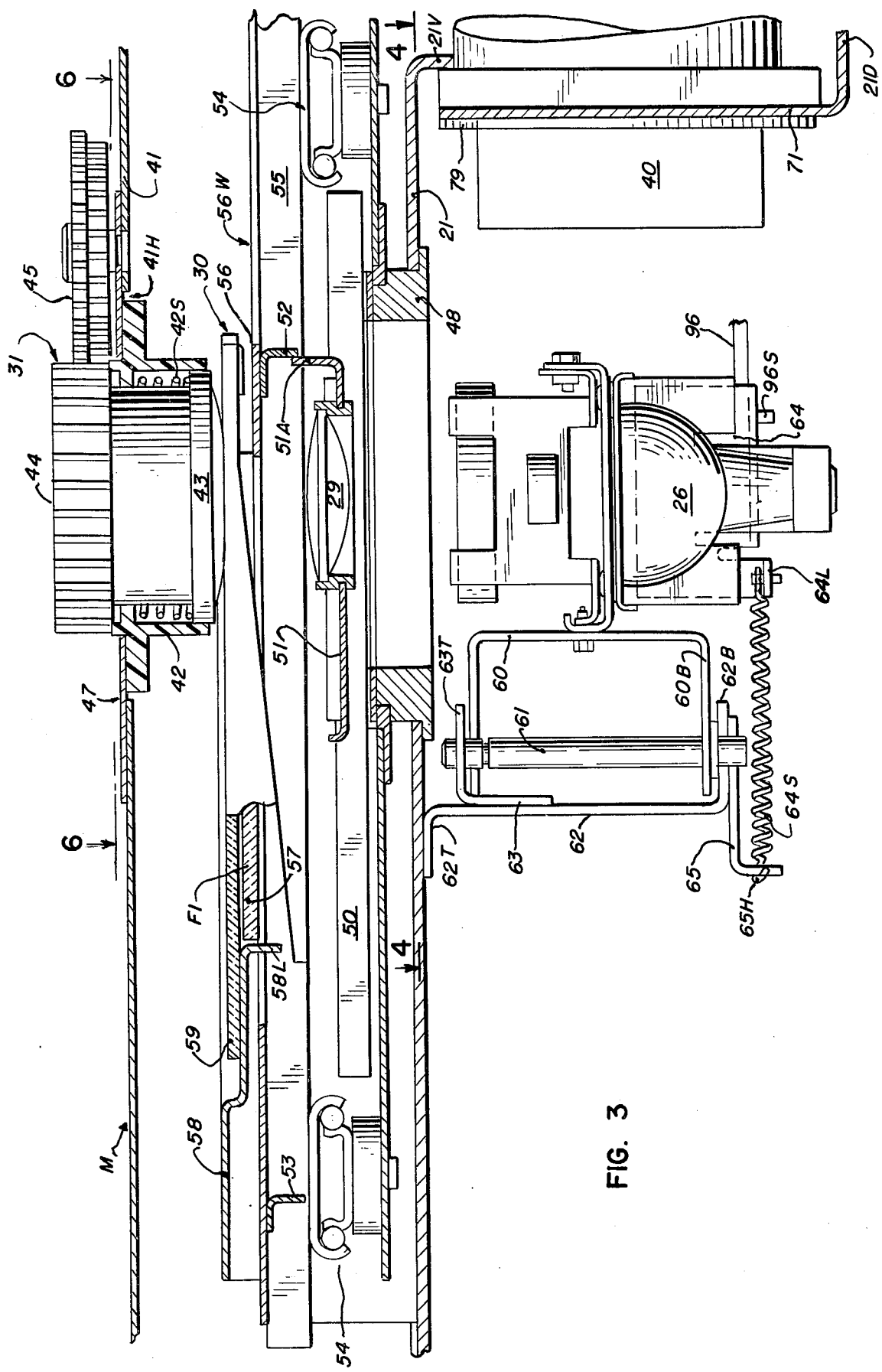
FIG. 3 is a transverse vertical section showing the fiche projection assembly in alignment with the common optical axis of the machine.
Figure 4:
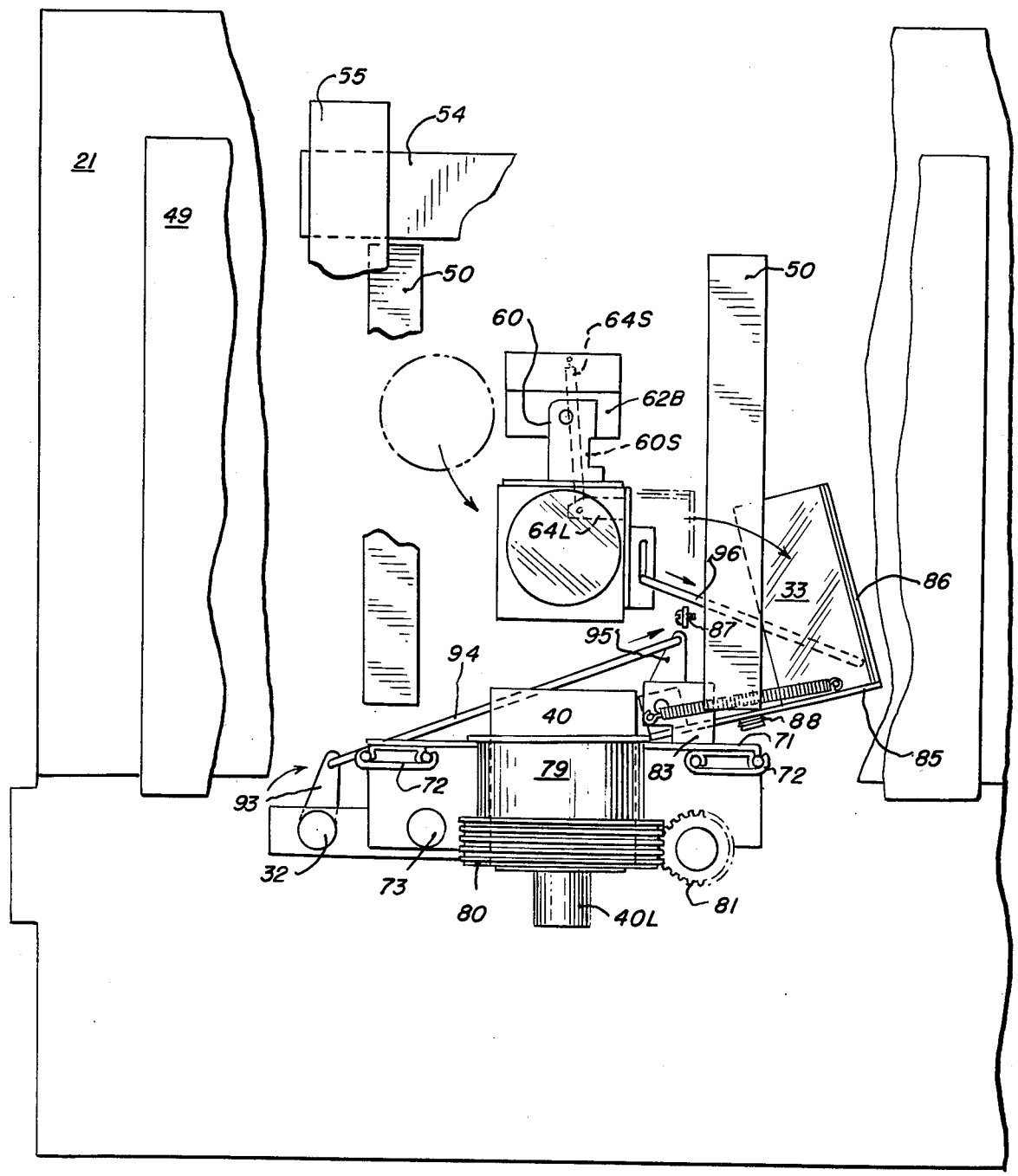
FIG. 4 is a plan view taken approximately as indicated on the line 4 — 4 of FIG. 3 and showing the fiche projection lamp assembly in operative position.
Figure 5:
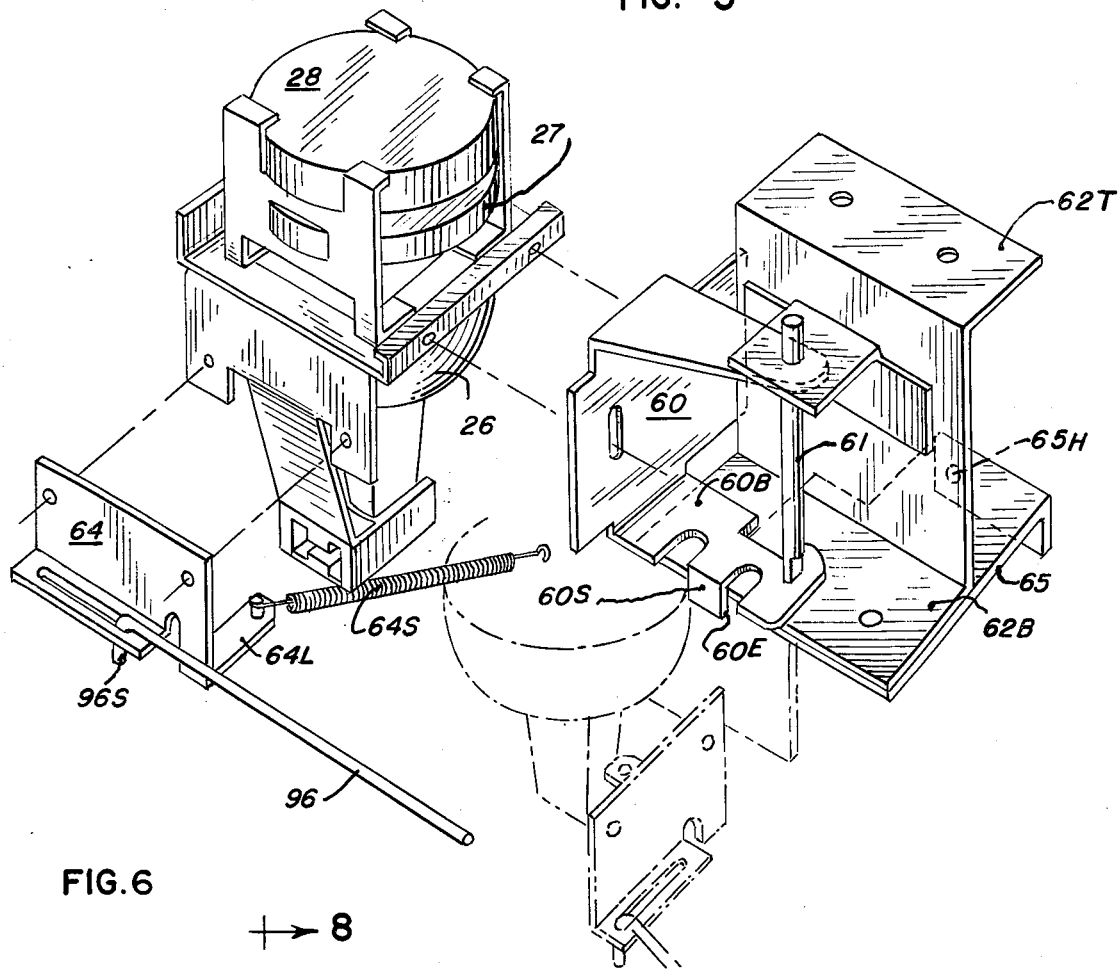
FIG. 5 is an exploded perspective view showing mounting details and change position configurations for the pivotally mounted fiche lamp assembly.
Figure 6:
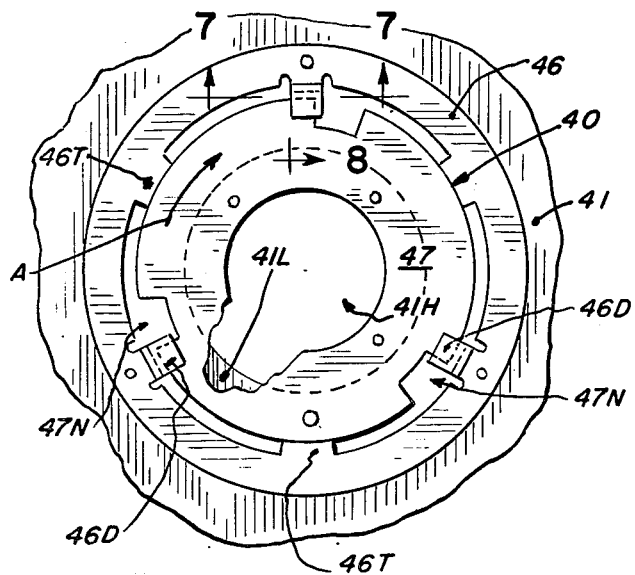
FIG. 6 is a fragmentary plan view of the fiche projection lens mounting arrangement and is taken approximately on the line 6 — 6 of FIG. 3.

It should be noted that for the fiche mode configuration shown diagrammatically in FIG. 1, the detailed drawings of FIGS. 3, 4 and 6 are applicable, while FIG. 5, which shows the fiche lamp assembly, shows it in its out-of-the-way position as illustrated in FIG. 2. Similarly, for the roll projection mode configuration shown in FIG. 2, the detailed drawings of FIGS. 9, 10, 12 and 13 show the parts in operative position.

FICHE FILM PROJECTION MODE

As best shown in FIGS. 3 and 6, the fiche mode projection lens assembly 31 is removably mounted within an over-sized hole 41 H provided in an otherwise conventional horizontal deck portion 41 of the machine's mainframe M. The projection lens assembly 40 may be of any conventional form and as shown includes a mounting collar 42 that receives a lower lens holder 43 threadedly engaged to an upper lens adaptor 44 with a bias spring 42 S reacting against the collar 42 to urge the holder unit downwardly into contact with the X-Y carrier 30 in accordance with conventional practice. The adaptor 44 has external teeth engaged with a conventional spur gear 45 to enable manual adjustment of the vertical position of the projection lens 40 relative to the fiche image plane defined by the carrier 30, this being conventional.

Figure 7:
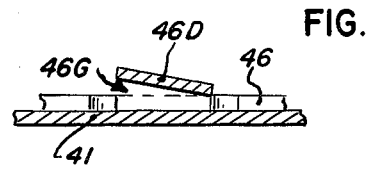
FIGS. 7 and 8 are fragmentary detailed section views taken as indicated by the lines 7 — 7 and 8 — 8 of FIG. 6.
Figure 8:
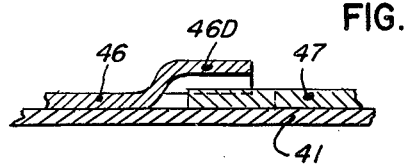
Figure 11:
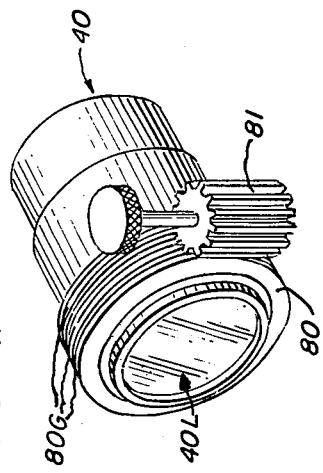
FIG. 11 is a perspective view of the roll projection lens fore and aft adjustment mechanism.

As best shown in FIG. 6, the mainframe deck portion 41 has a seat ring 46 fixed thereto in encircling offset relation to the over-size hole 41 H so that the deck lip 41 L bordering the hole serves as an upwardly facing support. The seat ring 46 is formed with a set of three integral equally spaced arcuate tabs 46 T to serve as centering guides and a set of three equally spaced, upwardly struck integral detents 46 D that are canted as shown in FIG. 7 to define wedge-like mounting grooves 46 G along the inner periphery of the seat ring.

Correspondingly, the lens collar 42 is attached to a metal annulus 47 having equally spaced external notches 47 N to enable seating of the annulus 47 on the deck lip 41 L by registering its notches 47 N with the detents 46 D and then rotating the annulus in the direction of the arrow A on FIG. 6 to bring the edge of the notch into the tapered groove 46 G defined by the corresponding detent.

The annulus is thus accurately positioned by engagement with the arcuate centering tabs 46 T on the mounting ring and is biased against the deck lip by the detents 46 D to provide a firm and stable support for the projection lens 40. The projection lens 31 may be installed or removed by a simple twisting motion when converting between the fiche mode and the roll mode.

As is conventional, the pedestal base 21 has an enlarged opening to receive a bearing collar 48 that rotatably mounts a head plate 49 to enable 180° swinging adjustment of the X-Y carrier 30 in those situations in which the fiche sheet has its images rotated 90° from standard. Whereas, the positive condenser lens 29 is usually mounted directly on the rotating head plate 49, in accordance with this invention, the lens 29 is supported on an additional set of Y slides 50 which are shown fixed to the head plate in flanking relation to the central opening 49 C, therein. For this purpose, the condenser lens 29 is seated in a special mounting bracket 51 which, in turn is carried by the movable top rails of the extra set of Y slides 50. The mounting bracket 51 includes a forwardly located upstanding abutment 51 A which, as explained hereinafter, is in lost-motion relation with fore and aft stops 52, 53 provided in depending relation on the lower or main carrier panel.

The fiche carrier assembly 30 is shown mounted to the rotatable head plate 49 by means of a set of X slides 54 which are fixed directly to the head plate and a set of Y slides 55 which are fixed to the movable top rails of the X slides 54. The Y slides 55 support the main carrier panel 56 which is arranged to receive and retain the bottom fiche glass 57 in any conventional manner, thereby defining the fiche image plane FI. The top carrier panel 58 is pivotally mounted to the lower carrier panel 56 in a conventional fashion adjacent the rear of its depending side flanges 58 F. As is conventional, the upper carrier panel receives the top fiche glass 59 and bias springs normally bias the top plate to swing upwardly to facilitate loading when the fiche carrier is drawn fully forward. During loading, a depending integral locator shelf 58 L on the top panel acts as a locating guide at the rear edge of the bottom glass to insure proper registry of the fiche sheet thereon. The bottom glass serves to accurately define the location of the image plane for the fiche projection mode in the conventional fashion.

Figure 9:
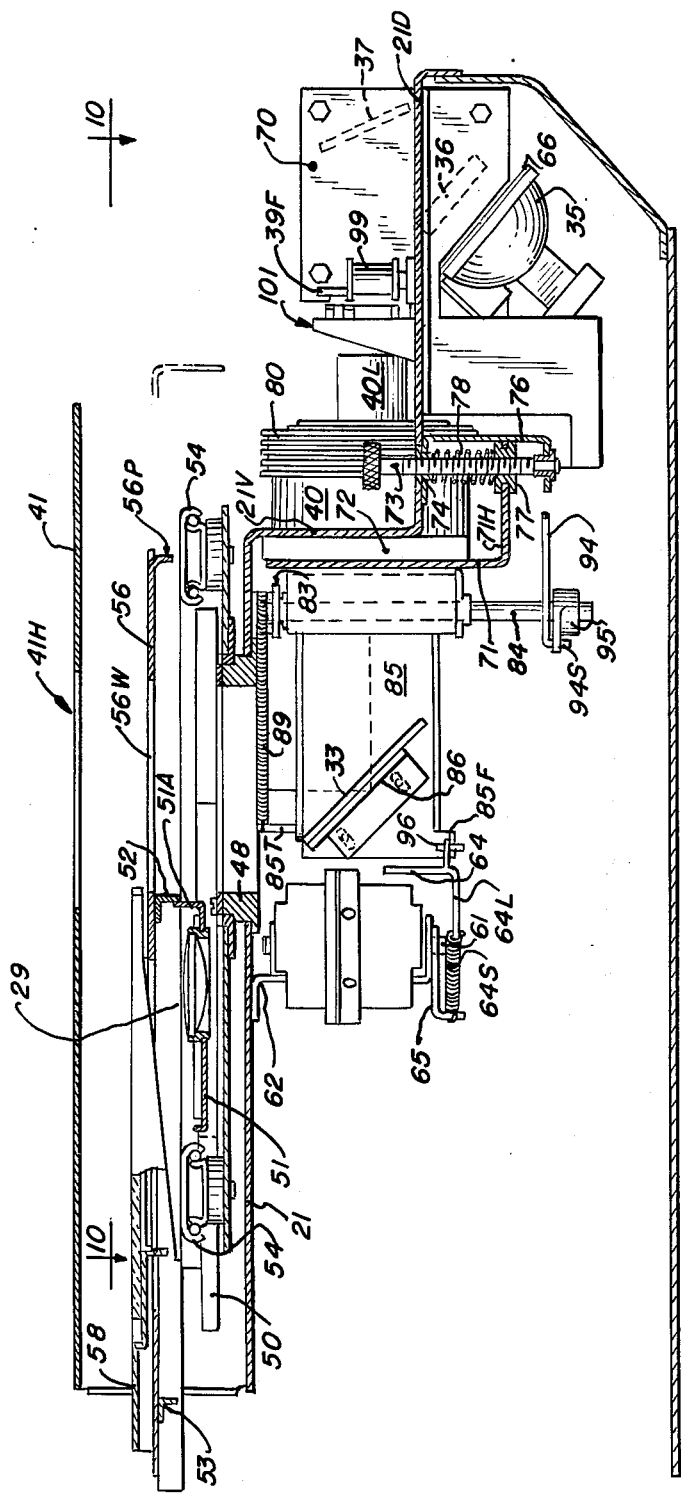
FIG. 9 is a fragmentary vertical section showing the roll projection system in operative position in alignment with the common optical axis.

As best shown in FIGS. 3 and 9, the forward region of the bottom carrier panel is provided with an enlarged window 56 W between the front pointer 56 P and the bottom glass 57, the window being of a size to span the light path at that region for the roll projection mode.

When switching to the roll mode, the user moves the carrier aft to the FIG. 9 position. During this movement, the lower carrier panel window 56 W is brought into registry with the optical path and is wider than the roll projection beam at this point. Correspondingly, the depending fore stop 52 on the lower carrier panel engages the upstanding abutment 51 A on the condenser lens bracket 51 to shift the same to an out-of-the-way position as shown in FIG. 9.

When switching to the fiche mode, the X-Y carrier is naturally drawn fully forward incident to fiche loading. This normal movement causes the depending aft stop 53 to engage the abutment 51 A on the condenser lens bracket 51 and shift the same to accurately register the lens 29 with the optical axis OA. All normal fiche indexing movements of the X-Y carrier are readily accommodated without displacement of the lens 29.

As shown in FIG. 3, the fiche lamp and lens assembly is mounted on a U-shaped swing bracket 60 that is carried by a vertical pivot pin 61 keyed to its bottom leg 60 B.

As best seen in FIG. 5, stationary support structure is provided to guide and limit swinging movement of the fiche lamp and lens assembly. The support structure includes a Z bracket 62 having its top leg 62 T secured to the under-face of the pedestal base wall 21 and an L bracket 63 having a leg 63 T cooperating with the bottom Z leg 62 B to serve as bearings for the pin 61.

The operative position of the fiche lamp assembly is shown in full lines in FIG. 4 and the out-of-the-way position is shown in full lines in the exploded view of FIG. 5. The U bracket 60 as shown in FIG. 5 has a depending stop 60 S engagable with the bottom leg 62 B of the Z bracket to determine the limit of travel of the fiche assembly towards its out-of-the-way position. The edge 60 E of this same stop 60 S is engagable with the same leg 62 B to determine the limit of travel of the fiche assembly towards its operative position shown in FIG. 4. A drive bracket 64 mounted along one side of the fiche lamp assembly has a depending leg 64 L engaged by one end of an over-center type detent spring 64 S. The other end of the detent spring is connected to a hole 65 H in a depending anchor 65 that is fixed to the bottom of the Z bracket 62. Thus, as shown in FIG. 5, the detent spring 64 S is over center in one direction to bias the fiche lamp assembly to the out-of-the-way position as determined by the broad side face of the depending stop 60 S on the U bracket 60 engaging the edge of the Z bracket 62. Correspondingly, as shown in FIG. 4, the detent spring 64 is over center in the opposite direction to bias the fiche lamp assembly into accurately aligned operative position on the common optical axis as determined by the end edge 60 E of the stop 60 S engaging the edge of the Z bracket 62.

ROLL FILM PROJECTION MODE

Figure 10:
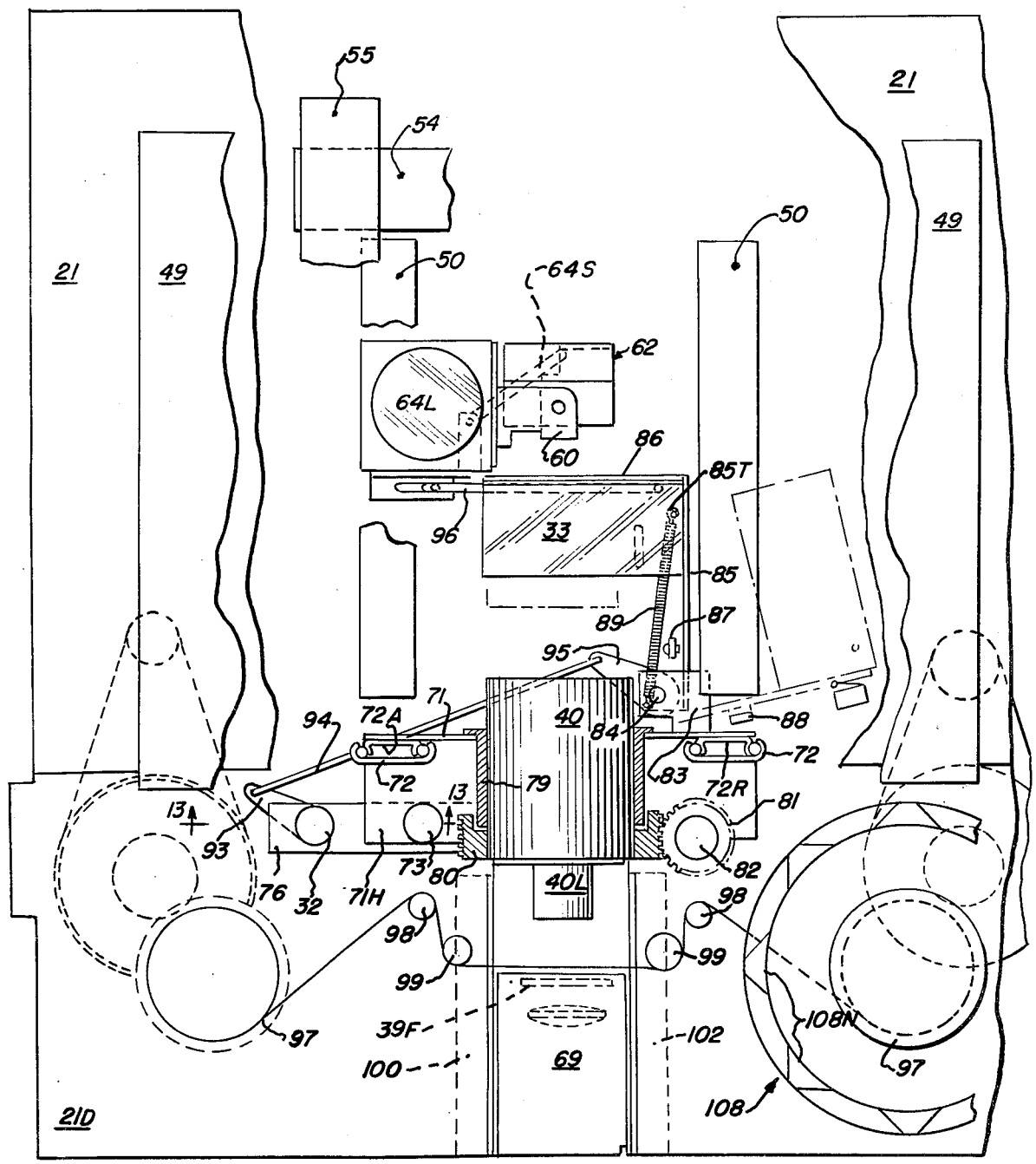
FIG. 10 is a top plan view taken approximately as indicated on the line 10 — 10 of FIG. 9.

The general arrangement of the roll beam projection elements as shown in FIGS. 9, 10 and 12 may be conventional.

Figure 15:
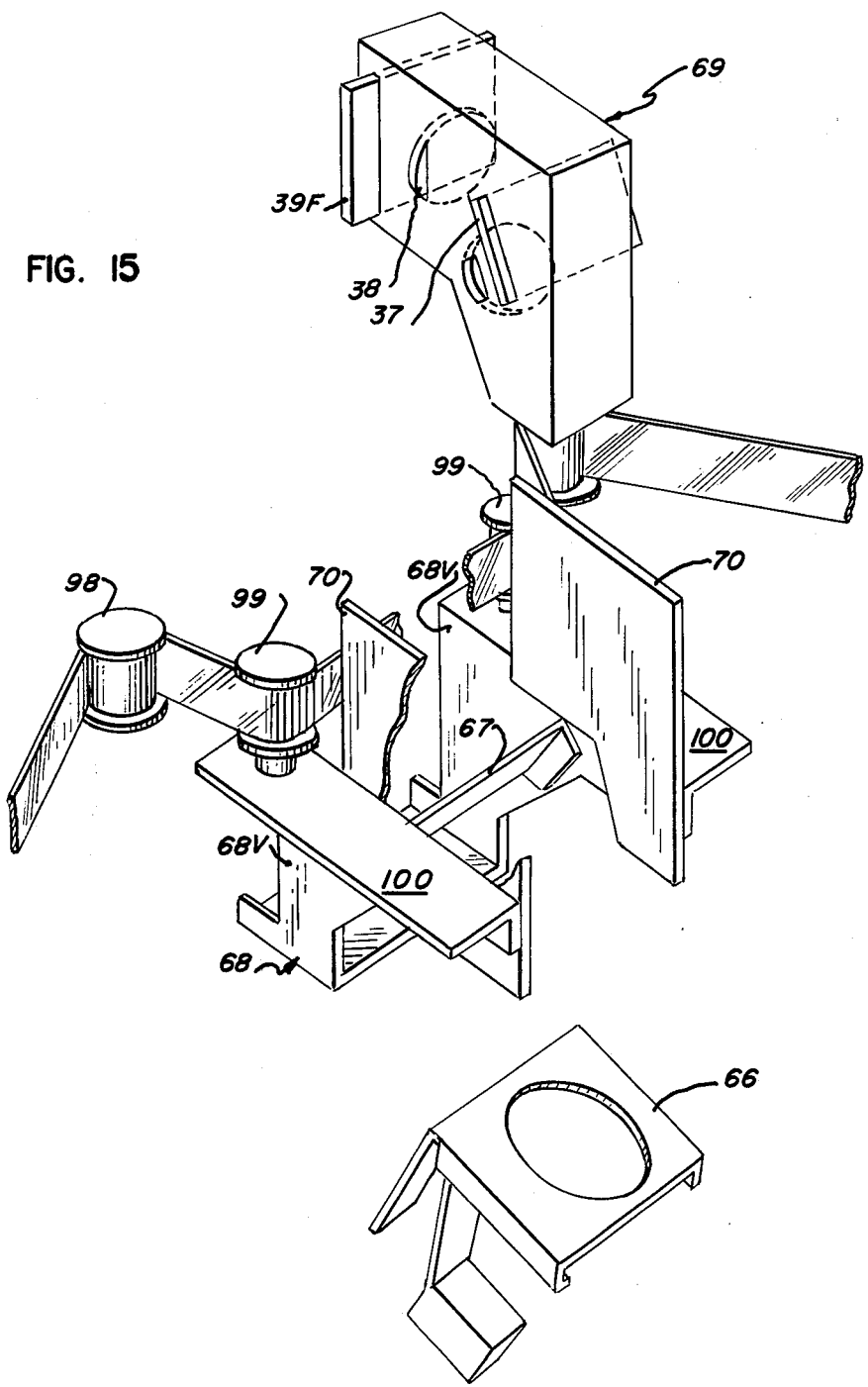
FIG. 15 is another exploded perspective view of the film gate portion of the roll projection system.

Thus, the lamp 35, negative condenser lens 36 and positive condenser lens 39 may be identical to the corresponding fiche elements. The lamp 35 and lens 36 are located within the pedestal base 21, with the lamp 35 having its mounting bracket 66 fixed to a U-shaped bracket 67 that is bridged between depending portions of a pair of vertical walls 68 V of a U-shaped bracket 68 carried by the front deck 21 D of the pedestal base, as best seen in FIG. 15.

The roll beam projection path extends obliquely through a floor opening in the deck 21 D and then horizontally through a housing 69 disposed between upstanding vertical partitions 70 carried by the U-bracket 68. The housing 69 mounts the 45° angle fixed mirror 37, the positive condenser lens 38 and the fixed glass 39 F of the film gate.

The disclosed embodiment includes a number of custom features in that the roll projection lens 40 is mounted for universal adjustment, including sufficient vertical travel for scanning double image roll films; the reflecting mirror 33 is mounted to undergo joint vertical movement with the roll projection lens 40 while also being shiftable between operative position in alignment with the common optical axis OA and an out-of-the-way position; and the film gate 39 defines a roll film image plane offset from the film travel path to provide clearance for roll film travel.

To provide vertical scanning travel for the roll film projection lens 40, it is mounted in a main carrier plate 71 that is attached to the inner rails 72 R of a pair of vertical slides 72, the outer rails being anchored to the vertical panel portion 21 V of the pedestal base.

A lens adjustment shaft 73 is mounted to the pedestal deck 21 D forwardly of the vertical panel portion 21 V (see FIGS. 10 and 12), the shaft 73 being journalled in bearing collars 74, 75 at the upper and lower ends of a fixed U-shaped bracket 76 that depends from the pedestal base. The shaft is threaded and engaged with a grooved drive nut 77 that flanks the upper and lower faces of a notched horizontal flange portion 71 H of the main carrier plate. A spring 78 normally biases the nut 77 downward to eliminate play in the lens adjustment system.

The prism type projection lens 40 is mounted in a bushing 79 (see FIG. 10) carried by the adjustable main plate 71 and is shown to include lens additives 40 L at its front end in the embodiment disclosed herein.

Fore and aft adjustment of the prism lens 40 is provided in a form that is compatible with the extended vertical adjustment. Thus, the front end of the prism lens is fitted with a drive collar 80 having a set of circular external grooves 80 G that define a row of annular teeth in mesh with a spur gear 81 in the form of a vertical drum. An adjustment knob 82 is keyed into the upper end of the drum gear 81 to effect fore and aft travel of the lens 40. It will be noted that the lens drive collar 80 maintains geared engagement with the drum 81 throughout the entire range of vertical travel of the main carrier plate 71.

As indicated previously, the shiftable reflecting mirror 33 is mounted for joint vertical movement with lens 40. Thus, a U-type support bracket 83 is attached to the rear face of the carrier plate 71 to mount a pivot shaft 84 that carries a mirror drive bracket 85. A cantilever type support bracket 86 for the mirror 33 is mounted on the outer end of the mirror drive bracket 85.

The operative position of the mirror 33, its support bracket 86 and the mirror drive bracket 85 is shown in full lines in FIGS. 9 and 10 and the out-of-the-way position is shown in phantom lines in FIG. 10.

The mirror drive bracket 85 is engagable with separate stop means 87, 88 that are fixed in the pedestal base to determine the limits of travel towards both positions. An over-center detent spring 89 has one end anchored in the top leg of the U-type bracket 83 and the other end anchored in a top flange 85 T near the outer end of the mirror drive bracket 85.

Thus, as is apparent in FIG. 10, the detent spring 89 is over center in one direction to bias the mirror into accurate alignment in the full line operative position and is over center in the opposite direction to bias the mirror to its out-of-the-way position.

SELECTIVE MODE CONTROL

The selective movement of the fiche lamp assembly and the mirror 33 is under the control of the hand knob 32 at the front of the unit (see FIG. 13), the knob 32 being provided at the upper end of a pivot shaft 91 mounted in a top bearing 92 T in the front deck 21 D and a bottom bearing 92 B located in a horizontal wall 21 H within the pedestal base. The depending lower end of the shaft 91 is fitted with a drive arm 93 that is connected to one end of a drive link 94. The other end of the drive link 94 is connected to a drive arm 95 on the depending lower end of the mirror pivot shaft 84.

A drive link 96 is connected in lost-motion relation between the drive bracket 64 for the fiche lamp and lens assembly and a downwardly offset flange 85 F (FIG. 9) on the mirror drive bracket 85.

The lost-motion connection between the drive link 96 and the fiche drive bracket 64 permits the over-center detent spring 64 S and the positive stop 60 S to control the travel of the fiche lamp and lens assembly between its operative and out-of-the-way positions. The lost-motion connection and the simple floating connection of the vertical stubs 96 S on the drive link 96 which engage in the drive bracket slot and in a hole in the 96 which engage in the drive bracket slot and in a hole in the mirror bracket flange 85 F also enable the level of the mirror 33 relative to the fiche lamp assembly to vary over a sufficient range to accommodate all desired adjustments in the roll projection system.

Similarly, the vertical stubs 94 S on the drive link 94 seat in holes in the drive arms 93, 95 to accommodate vertical movement of drive arm 93 in unison with the main carrier plate 71 for the shiftable mirror and the roll projection lens. The lost-motion and detent spring action of the system allows the stops 87, 88 for the mirror drive bracket 85 to position the mirror 33 separately of the fiche lamp assembly.

ROLL MODE FILM GATE

As best seen in FIGS. 10 and 14, the transport arrangement includes a film drive system having power driven hubs 97 for the supply and take-up reels, a pair of intermediate guide rollers 98 and a pair of alignment rollers 99 disposed to flank the roll film gate 39. The gate 39 includes fixed glass 39 F for defining the roll image plane RI and movable glass 39 M. The movable glass 39 M is normally spaced from the fixed glass during film travel and is shiftable by a positive drive linkage to hold the film flat against the fixed glass 39 F during projection.

In the disclosed arrangement, the alignment rollers 99 are mounted on horizontal flanges 100 that are rigid integral portions of the U-bracket 68 and located in rigid outboard relation to the vertical partitions 70 that mount the housing 69 for the fixed glass in fixed rigid position. Thus, the rollers 99 are accurately indexed relative to the fixed glass to define a film travel plane offset slightly from the image plane. During film movement while the movable glass is spaced away from the fixed glass the film will travel in slight clearance relationship to the fixed glass to avoid damage to the power driven film. Typically, the travel clearance may be on the order of 0.015 inches.

Selective positioning of the movable glass 39 M of the film gate 39 is effected through a solenoid actuated drive linkage which includes a bracket 101 (FIGS. 12 and 14) having depending arms 101 A mounting opposite ends of a pivot pin 102 carried in a fixed U-bracket 103 that is anchored to the pedestal base. A solenoid 104 has a projecting armature 104 A having a notched end pin connected to a drive link 105, with the drive link 105 having a drive pin 106 bridged between the depending arms 101 A of the pivot bracket. The upper end of the pivot bracket 101 has a window frame structure 101 W to receive a glass support frame 107 for mounting the movable glass 39 M therein in a spring-biased floating relation.

A set of four leaf springs 108 are mounted on the film side of the support frame 107 by means of suitable fasteners (not shown) which also secure the frame to the drive bracket 101. The frame 107 has a set of retention fingers 107 F along its vertical edges and extending towards the film travel path to define an over-size mounting pocket that receives the movable glass in floating relation, with the leaf springs urging the chamfered edges of the glass against the oblique end portions of the retaining fingers which overlap these chamfered edges as shown in FIG. 14A. An integral lower stop 107 L is provided on the frame and a bendable top stop 107 T is provided which is deformed following downward insertion of the glass into its mounting pocket as indicated in FIG. 14. Thus, the positive drive movement of the solenoid actuated linkage that controls shifting of the movable glass is accommodated by the spring biased floating mounting of the movable glass.

The transport system as shown is of the manual loading type in order to accommodate cassettes and film of any design. The right hand knob 97 in FIG. 10 is shown provided with a roll socket 108 of circular form having triangular notches 108 N spaced about its periphery to receive square or circular cassette cases.

Thus, while preferred constructional features of the invention are embodied in the structure illustrated herein, it is to be understood that changes and variations may be made by those skilled in the art without departing from the spirit and scope of the appended claims.

What is claimed is:

1. A convertible arrangement for selectively shifting fiche film projecting means and roll film projecting means into operative alignment with a common optical axis that intersects a fiche image plane and extends to a projection plane, the arrangement being characterized in that the fiche film projecting means includes beam projecting structure mounted for controlled shifting movement between an operative position of alignment with the optical axis and an out-of-the-way position spaced from the optical axis, the roll film projecting means includes beam projecting structure mounted for controlled shifting movement between an out-of-the-way position spaced from the optical axis and said operative position of alignment, and selectively operable control means interconnecting the fiche beam projecting structure and the roll beam projecting structure in ganged relationship to effect controlled shifting movement thereof for converting between a fiche film imput mode and a roll film input mode.

2. A convertible arrangement as defined in claim 1 said arrangement including means defining an opening at a location aligned with the locus of the operative position and wherein said fiche film projecting means includes a fiche beam projecting lens removably mounted in said opening in alignment with the common optical axis at a location beyond said operative position, and said roll film projecting means includes a roll beam projecting lens located in advance of said operative position to provide a roll beam at said opening that is smaller than the opening.

3. A convertible arrangement as defined in claim 1 said arrangement including means defining an oversize opening at a location aligned with the locus of the operative position and wherein said fiche film projecting means includes a fiche beam projecting lens removably mounted in said over-size opening in alignment with the common optical axis at a location beyond said operative position, and said roll film projecting means includes a roll beam projecting lens located in advance of said operative position to provide a roll beam at said opening that is wider than said fiche beam projection lens.

4. A convertible arrangement as defined in claim 1 wherein said fiche film projecting means includes a fiche film X-Y carrier means having an opening forwardly of the fiche film location and sufficiently wide to accommodate the roll beam thereat, slide means mounting the X-Y carrier means for shifting movement between a fiche mode position and a roll mode position wherein the opening is in alignment with the optical axis, support means for a fiche beam condenser lens shiftably mounted for movement between an operative position in alignment with the optical axis and an out-of-the-way position, and cooperating stop means on said carrier means and said support means for automatically shifting the fiche beam condenser lens to an out-of-the-way position when the X-Y carrier is moved to its roll mode position and for automatically restoring the fiche beam condenser means to operative position when the X-Y carrier means is moved forwardly to a fiche film loading position.

5. A convertible arrangement as defined in claim 1 and wherein said fiche film beam projecting structure includes a fiche lamp and condensing lens assembly shiftably mounted for movement between the operative position and an out-of-the-way position by said control means, and said roll film beam projecting structure includes reflecting means shiftably mounted for movement between the out-of-the-way position and the operative position by said control means.

6. A convertible arrangement as defined in claim 5, said arrangement including means defining an opening at a location aligned with the locus of the operative position and wherein said fiche film projecting means includes a fiche beam projecting lens removably mounted in said opening in alignment with the common optical axis at a location beyond said operative position, and said roll film projecting means includes a roll beam projecting lens located in advance of said operative position to provide a roll beam at said opening that is smaller than the opening.

7. A convertible arrangement as defined in claim 5 and wherein said fiche film projecting means includes a fiche film X-Y carrier means having an opening forwardly of the fiche film location and sufficiently wide to accommodate the roll beam thereat, slide means mounting the X-Y carrier means for shifting movement between a fiche mode position and a roll mode position wherein the opening is in alignment with the optical axis, support means for a fiche beam condenser lens shiftably mounted for movement between an operative position in alignment with the optical axis and an out-of-the-way position, and cooperating stop means on said carrier means and said support means for automatically shifting the fiche beam condenser lens to an out-of-the-way position when the X-Y carrier is moved to its roll mode position and for automatically restoring the fiche beam condenser means to operative position when the X-Y carrier means is moved forwardly to a fiche film loading position.

8. A convertible arrangement as defined in claim 1 said arrangement including means defining an oversize opening at a location aligned with the locus of the operative position wherein said fiche lamp projecting means includes a fiche beam projecting lens removably mounted in said over-size opening in common alignment with the common optical axis at a location beyond the common operative position, a top condenser lens shiftably mounted in an over-size opening in alignment with the common optical axis intermediate the fiche lens location and the common operative position, and a cooperating fiche lamp and lens assembly shiftably mounted for movement between the operative position and an out-of-the-way position by said control means.

9. A convertible arrangement as defined in claim 8 and wherein said roll film projecting means includes optical beam reflecting means shiftably mounted for movement between the out-of-the-way position and the operative position by the control means.

10. A convertible arrangement as defined in claim 9 and wherein said roll film projecting means includes a roll beam projecting lens located in advance of said operative position to provide a roll beam that is larger than the lens means normally located at each of the openings.

11. A convertible arrangement as defined in claim 1 wherein stop means limit movement of each of said structures at the common operating position thereof, wherein separate pivot means mount each of said structures for controlled swinging movement, each pivot means including over-center detent spring means for biasing each structure into engagement with the corresponding stop means, and wherein said control means includes an actuator, and lost-motion drive means connecting said structures in series relation to allow the stop means to define accurate alignment thereof in operative position.

12. A convertible arrangement as defined in claim 1 and wherein first pivot means mounts said fiche beam projecting structure for controlled swinging movement about a first vertical axis, second pivot means mounts said roll beam projecting structure for controlled swinging movement about a second vertical axis, carrier means mounts said second pivot means for vertical shifting movement, and said control means includes an actuator and drive means loosely connecting said projecting structures in series relation to accommodate relative vertical adjustments between said projecting structures.

13. A convertible arrangement as defined in claim 12 wherein stop means limit movement of each of said structures at the common operating position thereof, wherein each pivot means includes over-center detent springs for biasing each of said structures into engagement with the corresponding stop means and wherein said drive means is in lost-motion connection to said structures to allow the stop means to define accurate alignment thereof in the operative position.

* * * * *